Sept. 1, 1964         F. A. LINDLEY, JR                3,147,350
                MAGNETICALLY OPERATED REED SWITCH
                     Filed Dec. 18, 1961
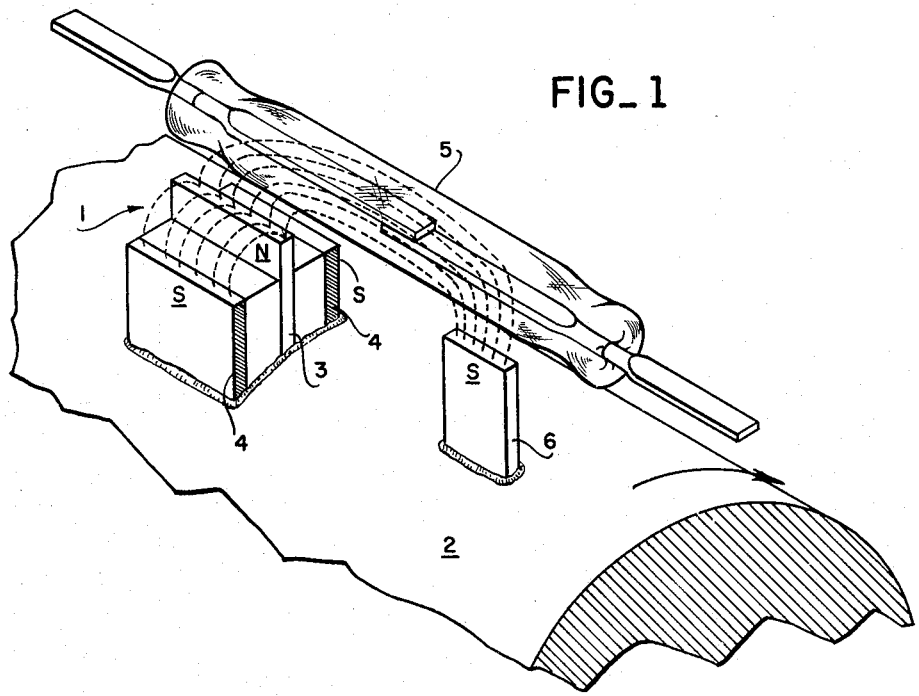
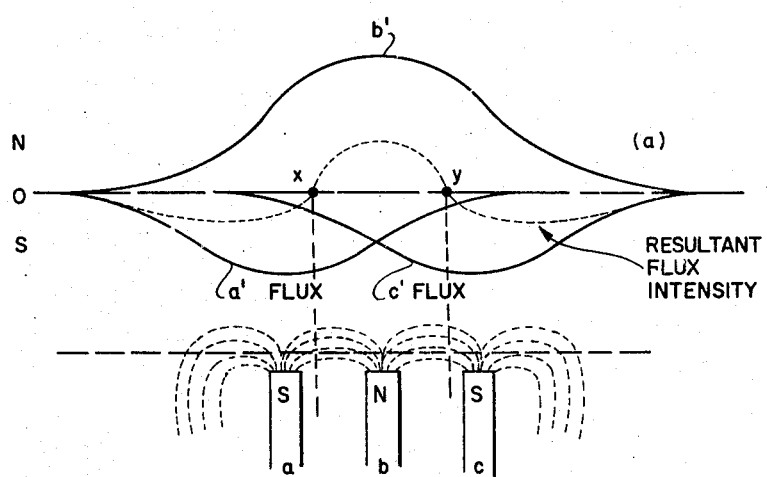
FIG_2
INVENTOR.
FREDERICK A. LINDLEY, JR.
BY
Agent

United States Patent Office 3,147,350
Patented Sept. 1, 1964

---

3,147,350
MAGNETICALLY OPERATED REED SWITCH
Frederick A. Lindley, Jr., Plainfield, N.J., assignor to Lockheed Aircraft Corporation, Burbank, Calif.
Filed Dec. 18, 1961, Ser. No. 159,935
2 Claims. (Cl. 200—87)

This invention relates to magnetic commutator switches and, more particularly, to a magnetically-operated reed switch.

A magnetic reed switch is a very simple device consisting of two reeds of soft iron spaced inside a small diameter glass tube. The two ends of the glass tube are pinched and sealed on the outer ends of the reeds and filled with an inert gas, generally nitrogen. The reeds are thus supported in the glass tube with a small overlapped gap. When a magnetic flux is set up in the reeds, they become magnetized and are attracted together, closing the circuit. This can be accomplished by a coil of wire around the switch, or by placing a permanent magnet at the proper axial position and sufficiently close to the switch to effect operation. When the magnetic flux is removed, the switch opens.

The coil configuration is the usual relay type of arrangement and could be used to operate the reed switch in a commutator design. However, there would be several disadvantages to the coil method. First, sequential pulses would have to be generated for individual application to each relay coil. Secondly, a considerably increased contact closing delay would result since the coil inductance would delay the current buildup and, consequently, the magnetic flux.

When a permanent magnet is brought up to a switch, there is no delay in the flux buildup. Magnetic field instantly versus time is determined only by the rapidity of positioning the magnet. The magnet method of operation is also far simpler, since it is only necessary to move the magnet sequentially past the switches. This suggests the obvious arrangement of placing the magnet on a rotating shaft and placing the reed switches in a circle about the shaft axis. Thus, as the magnet spins on the rotor, sequential operation of the switches occurs. Since the switches are stationary, the connecting leads may be easily brought out in a fixed pattern.

There are of course many possible positions of the magnet which will operate the reed switch, since the only requirement is to sufficiently magnetize the reeds by placing them in a flux path. It is also apparent that some positions of the magnet will provide shorter flux paths through the reeds between magnet poles and such positions will be more efficient. Efficiency, however, is not the problem; the primary aim is to shape the flux pattern so that the switch close-and-release points will have the most precise timing with respect to magnet position.

Therefore, it is an important object of this invention to provide a magnet arrangement which will improve the shape of the flux pattern to thereby improve the response characteristics of the reed switch.

Another object of the invention is to improve the configuration of magnetic circuits for the operation of hermetically sealed, magnetically operated reed type switches.

Another object of the invention is to provide a configuration of magnetic circuit which will provide uniform and consistent operation of magnetic devices.

A further object of the invention is to provide a magnetic circuit configuration to improve the shape of the magnetic flux intensity curve.

These and further objects of the invention will become apparent from the following detailed specification, taken together with the drawings, in which:

FIGURE 1 is a typical embodiment of the invention with only one reed illustrated, for purposes of clarity only;

FIGURE 2 is a composite curve of the flux densities of the invention as illustrated in FIGURE 1.

Briefly, the invention embodies a multiple magnet-pole arrangement having three poles, with the two outer poles of one polarity and the center pole of opposite polarity. A bias magnet may be used to enhance the operation.

Referring now to the drawings, the curve $b'$ of FIGURE 2 represents the flux pattern of a magnetic pole $b$, taken along the straight line (shown as broken line) and without the influence of the two side magnets $a$ and $c$. It will be seen that this curve is broad and flat, since the flux fringes out widely from the pole of the magnet. It is well-known that different switches placed in this magnetic field will close and open at different points along the same path, depending upon the pull-in and drop-out values of flux density.

It is apparent that, if the magnetic field about the pole could be controlled, it would be most desirable to have it increase abruptly to a saturating value of flux density and then decrease abruptly at the opening point of a given switch. Thus, a square wave of flux density is the desired objective, as this would close and open all switches at the same time, regardless of pull-in and drop-out values. While the square wave shape of flux density cannot be obtained, it does represent a desired objective.

The multiple magnet pole arrangement of FIGURE 1 provides a means of controlling the flux pattern to more closely achieve the desired square wave shape previously indicated. The magnet pole assembly generally designated as 1 is mounted on the periphery of a rotating shaft 2. The assembly 1 is comprised of three poles, the central pole 3 being of one polarity (shown as N) and the side poles 4 of the opposite polarity (S). It is of course to be understood that the reverse polarities will function equally well.

A hermetically sealed reed type switch 5 is fixedly mounted by suitable supports (not shown) adjacent the magnet assembly 1, at such distance therefrom so as to move along the dotted line as shown in FIGURE 2. A plurality of similar reed switches may be mounted in a circle around the shaft 2 for sequential operation by the magnet assembly. Leads (not shown) may be connected to external circuitry to be controlled by the switch.

If a reading of the respective flux intensities of the triple-pole arrangement of FIGURE 2($b$) is made along the broken line, the resultant flux intensity would be as shown in FIGURE 2($a$). Since the two outer poles are of opposite sign to the center pole, a neutral point exists between adjacent poles. This confines the flux of the center North pole to the position between these neutral points $x$ and $y$ in FIGURE 2. It is, of course, to be understood that the two outer poles would be of lower strength so that they do not cause the switch to operate. In this regard, the curves of FIGURE 2 are to be understood as not to scale, and are exaggerated for purposes of clarity. In addition, to further reduce the effect of the side poles, the center pole may be (and it is, preferably) raised above the level of the side poles. Such a construction as shown in FIGURE 1 provides a very sharp rise in the resultant flux intensity near the point $x$ and a sharp decrease near the point $y$. Thus, regardless of the pull-in and drop-out points of the particular reed switch, a uniform and consistent operation is assured, Due to physical properties, the reed switch requires a higher flux intensity for closing than for opening. Symmetrical placement of the magnetic poles as shown in FIGURE 1 results in a symmetrical flux pattern and, in such a case, the switch operation is non-symmetrical.

However, it has been discovered that a non-symmetrical configuration of the poles results in shifting of the vertical axis of the flux pattern and thereby provides symmetry in the switch operation.

A further refinement has been made to the switch as the result of past observations. By using a small, end-polarized magnet in conjunction with the three-pole magnet, the side lobes can be reduced and the main lobe increased. When such a bias magnet 6 is placed as shown in FIGURE 1, the flux pattern aids switch closure as the center pole passes under the reed switch. In addition, the net flux pattern with the bias magnet opposes switch closure by the end poles.

Thus, it is believed readily apparent that good commutation can be achieved by rotating a three-pole magnet past a series of reed switches. Even better results are attained by the addition of a bias magnet.

While a specific embodiment of the invention has been shown and described, it should be understood that certain alterations, modifications and substitutions may be made to the instant disclosure without departing from the spirit and scope of the invention as defined by the appended claims.

I claim:
1. A magnetically operated switch device comprising
   a rotatable shaft,
   a magnetic assembly having three poles mounted side by side on the periphery of said shaft,
   a pair of normally open switch elements positioned adjacent the rotational path of said magnetic assembly,
   said assembly consisting of two similar polarity outer poles and an opposite polarity center pole, and a bias magnet of polarity opposite to said center pole mounted on said shaft and spaced longitudinally along said shaft and in line with said center pole.
2. A permanent magnet assembly for enhancing the resultant flux pattern comprising
   three poles mounted side by side,
   the center pole having one polarity and the side poles having a polarity opposite to that of the center pole,
   said side poles having a weaker flux density than said center pole,
   a bias magnet having a polarity opposite to said center pole and
   means mounting said bias magnet substantially equidistant from said three poles and in line with said center pole.

References Cited in the file of this patent
UNITED STATES PATENTS

| | | |
|---|---|---|
| 2,869,563 | Schoengrun | Jan. 20, 1959 |
| 2,872,597 | Ormond | Feb. 3, 1959 |
| 2,895,092 | Cluwen | July 14, 1959 |
| 2,922,994 | Kennedy | Jan. 26, 1960 |
| 2,929,896 | Ronning | Mar. 22, 1960 |

FOREIGN PATENTS

| | | |
|---|---|---|
| 849,878 | Germany | Sept. 18, 1952 |